United States Patent
Ross et al.

(10) Patent No.: US 6,263,527 B1
(45) Date of Patent: Jul. 24, 2001

(54) SLEEPER BED FOR TRUCKS

(76) Inventors: Scott F. Ross; Randolph Q. Ross, both of 581 NE. Alameda, #28, Roseburg, OR (US) 97470

( * ) Notice: Subject to any disclaimer, the term of this patent is extended or adjusted under 35 U.S.C. 154(b) by 0 days.

(21) Appl. No.: 09/413,276

(22) Filed: Oct. 6, 1999

(51) Int. Cl.[7] .............................. A47C 17/80; B60P 3/38; B62D 33/06
(52) U.S. Cl. ................. 5/118; 5/309; 5/136; 296/190.02
(58) Field of Search ........................... 296/190.02; 5/541, 5/244, 118, 136, 309; 248/638, 562, 581

(56) References Cited

U.S. PATENT DOCUMENTS

| | | |
|---|---|---|
| 3,299,447 * | 1/1967 | Dome ........................................ 5/118 |
| 3,371,359 * | 3/1968 | Dome ........................................ 5/118 |
| 3,760,436 | 9/1973 | Zach et al. . |
| 4,144,601 | 3/1979 | Anderson et al. . |
| 4,196,483 * | 4/1980 | Lefler et al. ............................. 5/118 |
| 4,497,078 | 2/1985 | Vogel et al. . |
| 4,589,620 | 5/1986 | Sakamoto . |
| 4,979,248 | 12/1990 | Kelly . |
| 5,199,690 | 4/1993 | Marshall . |
| 5,218,728 | 6/1993 | Lloyd et al. . |
| 5,294,085 | 3/1994 | Lloyd et al. . |
| 5,638,560 | 6/1997 | Rigdon et al. . |

* cited by examiner

*Primary Examiner*—Michael F. Trettel
(74) *Attorney, Agent, or Firm*—Edward A. McConwell, Jr.

(57) ABSTRACT

An improved sleeper bed for over-the-road trucks comprises a first upper frame and a second lower frame with an air spring mounted between the first and second frames for dampening the movement of the frames toward one another. A pair of scissors-like struts extend between the upper and lower frames and allow the upper frame to move up and down according to the amount of force thereon. A pair of pillow block bearings are mounted to braces on the lower frame. A pair of guide rods extend downwardly from the upper frame and are telescopically received in respective pillow block bearings. The pillow block bearings allow the guide rods to shift or pivot slightly when horizontal forces are experienced by the sleeper bed so as to reduce the shock felt by a user thereon.

19 Claims, 4 Drawing Sheets

SLEEPER BED FOR TRUCKS

BACKGROUND OF THE INVENTION

This invention relates generally to providing an improved sleeper bed for over-the-road trucks and, more particularly, to a sleeper bed that minimizes the vibration and shock caused by both vertical and horizontal movements of the truck.

An over-the-road trucker is required by law to have a certain number of hours of sleep relative to the number of hours of continuous driving. Most over-the-road truck drivers satisfy this sleep requirement by sleeping in their trucks to avoid the inconvenience, expense, and impracticality of sleeping in a hotel. Accordingly, most over-the-road truck cabs include a sleeping compartment having a bed. The driver can either temporarily suspend driving and sleep in the compartment or sleep in the compartment while a second driver continues to drive. While having two drivers is advantageous relative to meeting shipping deadlines, sound sleep is difficult to obtain in the sleeping compartment of a moving semi-truck.

Various apparatus have been proposed in the prior art for improving the ride of sleeper beds for trucks, e.g. U.S. Pat. Nos. 5,638,560 and 4,144,601 to Rigdon and Anderson, respectively. These devices, however, are relatively complex in construction and still do not provide optimum comfort relative to all types of forces that may be exerted on the sleeper bed during transit.

Therefore, it is desirable to have a sleeper bed that minimizes vibrations and vertical forces upon the bed caused by bumps in the road. It is also desirable to have a sleeper bed that reduces the effect of horizontal forces upon the bed caused by certain driving maneuvers.

SUMMARY OF THE INVENTION

A sleeper bed constructed in accordance with the present invention utilizes a first lower frame and a second upper frame, both frames being generally rectangular with interior bracing for strength and stability. A cushion or mattress may be placed upon the second upper frame for supporting a user. An air spring is mounted between the first and second frames for restricting the movement of the frames toward one another, such as by the weight of a user lying on the cushion.

A pair of scissors-like struts extend between the first and second frames and allow the first upper frame to move up and down according to the amount of weight placed on the first upper frame and shocks encountered by the moving truck. A pair of pillow block bearings are mounted to braces on the first lower frame. A pair of guide rods extend downwardly from the first upper frame and are slidably received in respective pillow block bearings. Each pillow block bearing allows a guide rod to shift or pivot slightly when horizontal forces are experienced by the sleeper bed, as, for example, upon a turning, jerking, or swerving maneuver of the truck. This construction also reduces stress on the guide rods and reduces the shock of the movement experienced by a person lying on the cushion.

The air spring is mounted within a housing attached to the underside of the first lower frame. The housing may extend into a storage compartment that is standard on some over-the-road truck cabs. Rubber stoppers may be mounted on the lower frame to lessen the impact of the frames against one another and to dampen vibrations.

Therefore, it is a general object of this invention to provide an improved sleeper bed for over-the-road truck cabs which reduces vibration and movement of a sleeper bed while the cab is in motion.

Another object of this invention is to provide an improved sleeper bed, as aforesaid, which reduces the transmission of vibrations or impact forces between objects.

Still another object of this invention is to provide an improved sleeper bed, as aforesaid, which restricts movement between portions of the sleeper bed due to weight variations.

Yet another object of this invention is to provide an improved sleeper bed, as aforesaid, which reduces transmission of horizontal forces upon the sleeper bed.

A further object of this invention is to provide an improved sleeper bed, as aforesaid, having a relatively simple construction that is easy and inexpensive to manufacture.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 4:
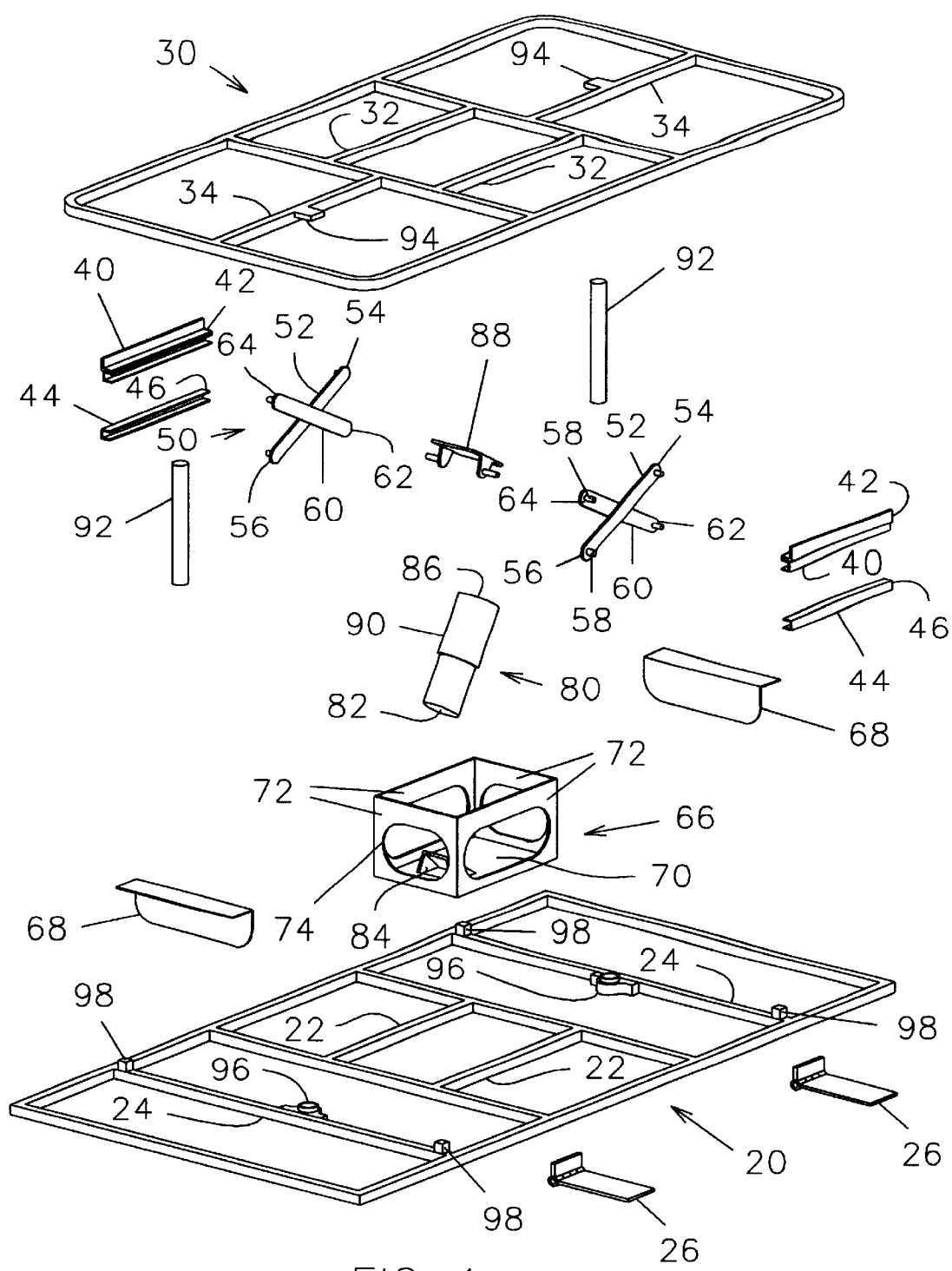
FIG. 4 is an exploded view of the sleeper bed as in FIG. 1.

An improved sleeper bed 10 for over-the-road trucks having a sleeper compartment within the cab is shown in FIGS. 1–4. The sleeper bed 10 includes a first, lower frame 20 and a second, upper frame 30. The frames 20, 30 are generally rectangular and include braces extending between peripheral frame bars for increasing the strength and stability thereof (FIG. 4). The braces of the upper frame 30 are configured to support a cushion or mattress (not shown) thereon. The lower frame 20 also includes a hinge 26 (FIG. 4) for pivotally mounting the lower frame 20 to a wall of a truck sleeping compartment.

A first set 40 of opposed guide tracks are mounted to parallel braces 32 of the upper frame 30. A second set 44 of opposed guide tracks are mounted to parallel braces 22 of the lower frame 20. A pair of opposed scissors-like struts 50 couple the first lower frame 20 to the second upper frame 30. Each strut 50 comprises a first arm 52 and a second arm 60. First ends 54, 62 of first 52 and second 60 arms of each strut 50 are pivotally coupled to first ends 42, 46 of the first 40 and second 44 sets of guide tracks, respectively. Preferably, first ends 54, 62 of first 52 and second 60 arms are fastened to the guide tracks 40, 44 with bolts. Second ends 56, 64 of first 52 and second 60 arms of each strut 50 are slidably coupled to second 44 and first 40 sets of guide tracks, respectively, with pins 58.

Figure 2:
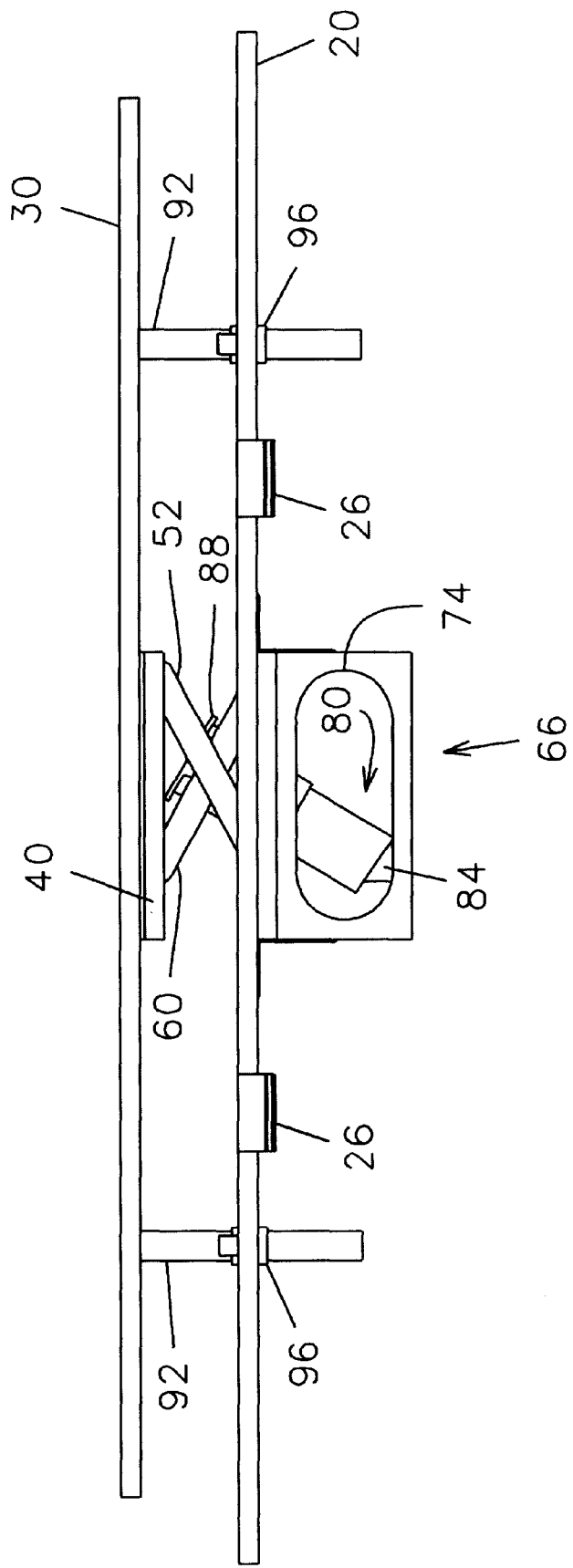
FIG. 2 is a front view of the sleeper bed as in FIG. 1.
Figure 3:
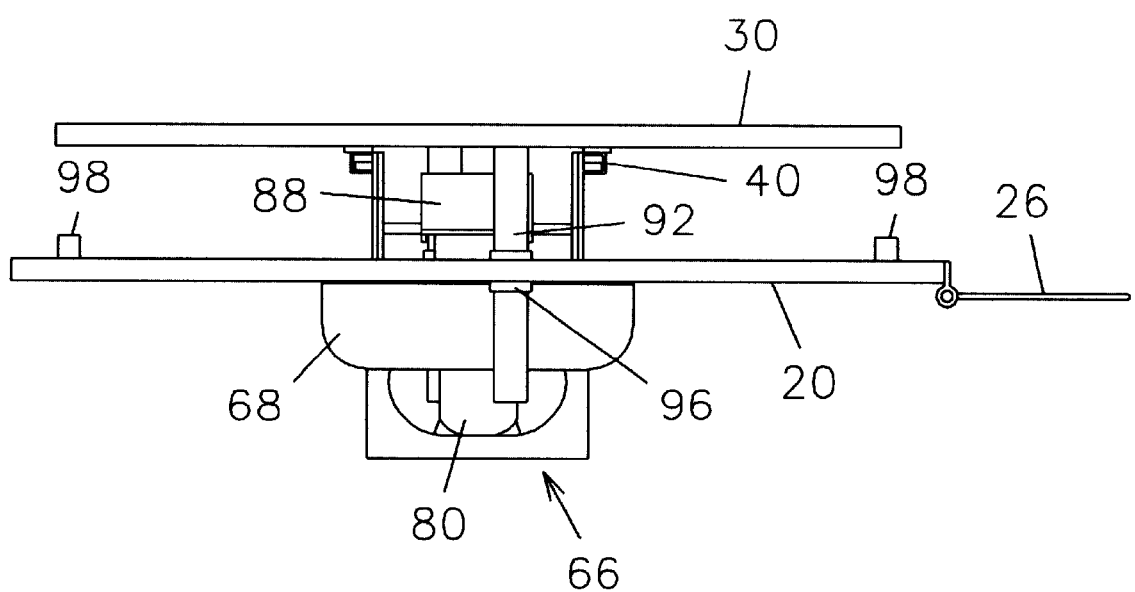
FIG. 3 is a right side view of the sleeper bed as in FIG. 1.

A housing 66 is fixedly attached to a pair of mounting brackets 68 which, in turn, are fixedly attached to the parallel braces 22 of the lower frame 20 (FIG. 2). The housing 66 extends beneath the lower frame 20 into the storage compartment found in the sleeping compartments of most over-the-road trucks. The housing 66 includes a bottom 68 having a rectangular configuration with upstanding side walls 72 extending from each edge thereof and terminating in an open upper end. Each side wall 72 presents an aperture 74 therethrough to provide access to an interior space defined thereby.

Figure 1:
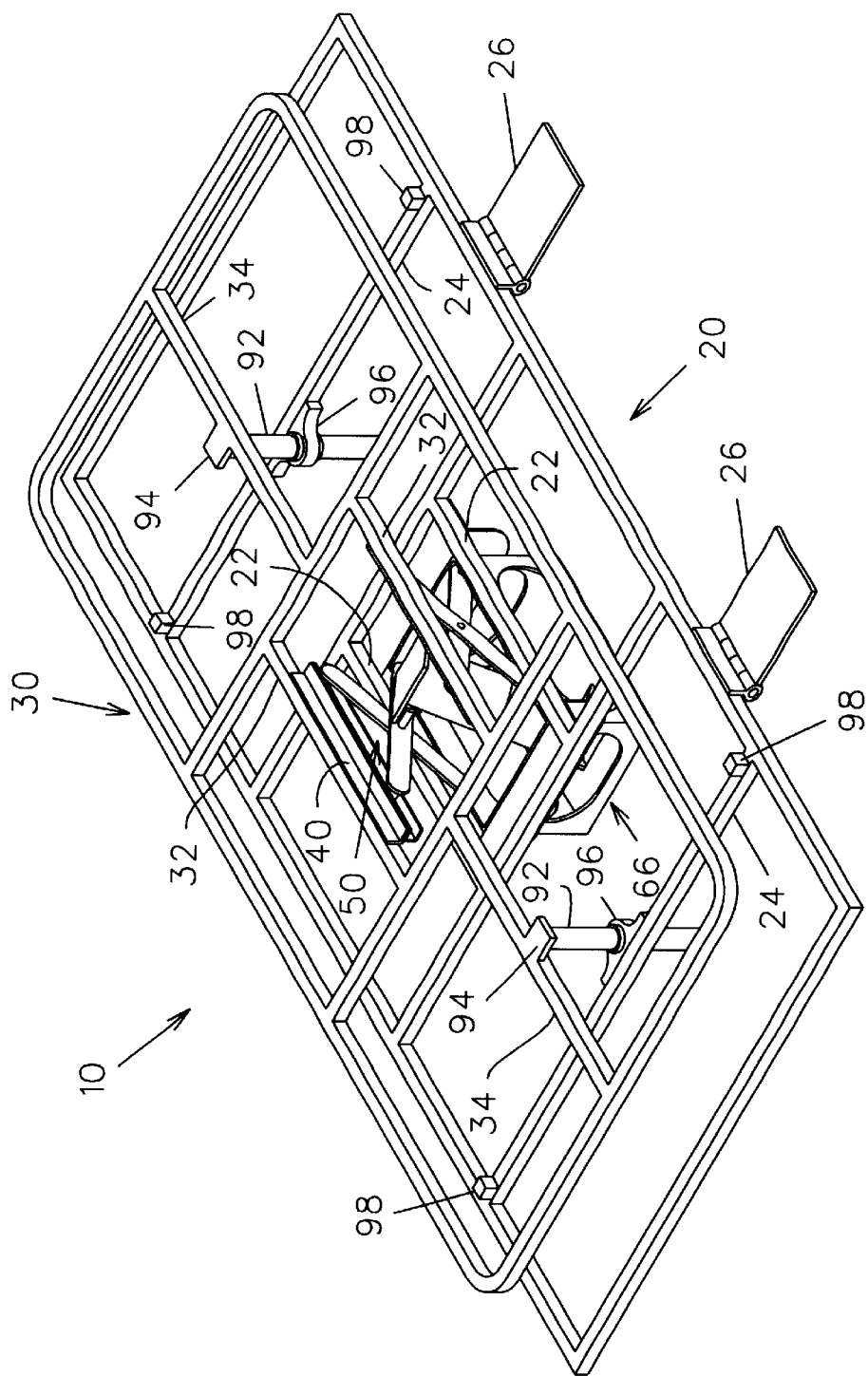
FIG. 1 is a perspective view of the sleeper bed according to the present invention.

A first end 82 of an air spring 80 is mounted to a first plate 84 fixedly attached to the bottom 68 of the housing 66. A second end 86 of the air spring 80 is fixedly attached to a second plate 88 (FIGS. 1 and 4). The second plate 88 is pivotally coupled to the struts 50 (FIG. 1) such that the air spring 80 is contracted or expanded upon movement of the struts 50. The air spring 80 includes a bladder 90 for holding a selected volume of air. A pneumatic pump (not shown) may be coupled to the air spring 80 such that the volume of air in the air spring 80, and thus its firmness, may be regulated by a user.

A pair of rods 92 are fixedly attached to flanges 94 extending from braces 34 of the upper frame 30 and extend downwardly therefrom. A pair of pillow block bearings 96 are mounted to braces 24 of the lower frame 20 and are positioned to receive free ends of the rods 92 therethrough. The rods 92 are free to slide vertically within the bearings 96 according to up and down movement of the upper frame 30 relative to the lower frame 20. Thus, the rods stabilize the frames relative to one another. Linear bearings could also be used. The pillow block bearings 96 also allow the rods 92 to shift or pivot slightly when horizontal forces are experienced by the upper frame 30, such as during turning, jerking, or swerving movements of the truck.

Further, a plurality of rubber bumpers 98 are fixedly attached to the lower frame 20 at various positions to dampen vibrations and to minimize the shock when the upper frame 30 suddenly contacts the lower frame 20. This sudden contact may occur when a large amount of weight is suddenly placed on the second frame or if a large bump is encountered on the road.

In function, the lower frame 20 of the sleeper bed 10 is pivotally mounted to the rear wall of the sleeper compartment of an over-the-road truck such that the sleeper bed may be folded up into a position adjacent the rear wall when not in use or when retrieving items from the truck storage compartment. A mattress may be placed on the upper frame 30 to accommodate a recumbent person. The air spring 80 resists the weight of a person on the upper frame 30 so as to reduce the shock when bumps are encountered or merely from the vibration of the truck's engine. The pillow block bearings 96 also reduce shock to a user by allowing the guide rods 92 to shift slightly when horizontal forces are encountered.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. An improved sleeper bed for use in the cab of a truck, comprising:
   a first frame;
   a second frame for supporting a cushion;
   means extending between said first and second frames for permitting movement of said first and second frames toward and apart from each other along a vertical axis;
   bias means between said first and second frames for dampening the movement of said first and second frames toward each other;
   a rod attached to said second frame and aligned generally parallel with the vertical axis; and
   a bearing pivotally mounted to said first frame for pivotal movement about a horizontal axis and for telescopically receiving said rod, said bearing pivoting upon horizontal movement of said rod so as to reduce the shock of horizontal forces exerted on said rod.

2. A sleeper bed as in claim 1, wherein said bias means comprises a spring, said spring including:
   a first end coupled to said first frame; and
   a second end coupled to said second frame.

3. A sleeper bed as in claim 2, wherein said spring is an air spring further comprising a flexible bladder between said first and second ends adapted to hold air under pressure therein, said bladder responsive to a weight of a user on said cushion.

4. A sleeper bed as in claim 1, wherein said means for providing relative up and down movement between said first and second frames includes a first arm and a second arm disposed in a scissors-like configuration, said first arm having a lower first end pivotally coupled to said first frame with said second arm having an upper second end pivotally coupled to said second frame, said first arm having an opposed second end slidably coupled to said second frame with said second arm having an opposed first end slidably coupled to said first frame.

5. A sleeper bed as in claim 1 further comprising at least one rubber support mounted on a top side of said first frame for dampening vibration between said first and second frames.

6. A sleeper bed as in claim 2 further comprising a housing fixedly attached to said first frame, said housing having a bottom wall and oppositely disposed upstanding side walls terminating in an open upper end, said first end of said spring attached to said bottom wall and said second end extending through said open end of said housing.

7. A sleeper bed as in claim 1 wherein said bearing is a pillow block bearing.

8. An improved sleeper bed for use in the cab of an over-the-road truck having a sleeping compartment with an upstanding wall, comprising:
   a first frame pivotally mounted to said wall;
   a second frame for supporting a cushion;
   means extending between said first and second frames for permitting movement of said first and second frames toward and apart from each other along a vertical axis; and
   bias means between said first and second frames for dampening the movement of said first and second frames toward each other.

9. A sleeper bed as in claim 8 wherein said means for providing relative up and down movement between said first and second frames includes a pair of first arms and second arms connected in a scissors-like configuration, said first and second arms having first ends pivotally coupled to said first and second frames, respectively, and opposed second ends slidably coupled to said second and first frames, respectively.

10. A sleeper bed as in claim 9 wherein said bias means is an air spring, said air spring further comprising:
   a first end coupled to said first frame;
   a second end coupled to said second frame; and
   a flexible bladder adapted to receive pressurized air therein, said bladder resisting movement of said second frame under the weight of a user on said cushion.

11. A sleeper bed as in claim 8 wherein said bias means is an air spring, said air spring further comprising:
- a first end coupled to said first frame;
- a second end coupled to said second frame; and
- a flexible bladder adapted to receive pressurized air therein, said bladder resisting movement of said second frame under the weight of a user on said cushion.

12. A sleeper bed as in claim 8 further comprising at least one rubber support mounted on a top side of said first frame for dampening vibration between said first and second frames.

13. A sleeper bed as in claim 11 further comprising a housing fixedly attached to said first frame, said housing having a bottom wall and oppositely disposed upstanding side walls terminating in an open upper end, said first end of said air spring attached to said bottom wall and said second end extending through said open end of said housing.

14. A sleeper bed as in claim 8 further comprising:
- a pillow block bearing mounted on said first frame; and
- a rod vertically depending from said second frame and freely extending through said pillow block bearing, said pillow block bearing adapted to allow said rod to shift according to horizontal forces exerted on said second frame, whereby to reduce forces upon a user recumbent on said cushion.

15. An improved truck cab having a sleeper bed, the bed comprising:
- a first frame mounted within said truck cab;
- a second frame for supporting a cushion;
- means extending between said first and second frames for permitting movement of said first and second frames toward and apart from each other along a vertical axis;
- bias means between said first and second frames for dampening the movement of said first and second frames toward each other;
- a bearing pivotally mounted on said first frame;
- a rod depending from said second frame and received through said bearing, said bearing pivoting to allow said rod to shift when horizontal forces are upon said second frame for dampening lateral movement of said second frame upon lateral movement of said truck cab.

16. An improved truck cab as in claim 15 wherein said bias means is an air spring, said air spring further comprising:
- a first end coupled to said first frame;
- a second end coupled to said second frame; and
- a flexible bladder adapted to receive pressurized air therein, said bladder resisting movement of said second frame under the weight of a user on said cushion.

17. An improved truck cab as in claim 15 further comprising a means for providing relative up and down movement between said first and second frames, said means including a pair of first arms and second arms connected in a scissors-like configuration, said first and second arms having first ends pivotally coupled to said first and second frames, respectively, and opposed second ends slidably coupled to said second and first frames, respectively.

18. A truck cab as in claim 15 further comprising at least one rubber support mounted on a top side of said first frame for dampening vibration between said first and second frames.

19. A truck cab as in claim 16 further comprising a housing fixedly attached to said first frame, said housing having a bottom wall and oppositely disposed upstanding side walls terminating in an open upper end, said first end of said air spring attached to said bottom wall and said second end extending through said open end of said housing.

* * * * *